United States Patent
Hall et al.

(10) Patent No.: US 10,273,858 B2
(45) Date of Patent: Apr. 30, 2019

(54) SOOT LOAD ESTIMATION DURING IDLE OR LOW LOAD

(71) Applicant: Cummins Emission Solutions Inc., Columbus, IN (US)

(72) Inventors: Tony J. Hall, Bemus Point, NY (US); Yinghuan Lei, Columbus, IN (US); Weiwen Wang, Columbus, IN (US); Daniel D. Wilhelm, Nashville, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 434 days.

(21) Appl. No.: 14/957,100

(22) Filed: Dec. 2, 2015

(65) Prior Publication Data
US 2017/0159535 A1 Jun. 8, 2017

(51) Int. Cl.
*F01N 11/00* (2006.01)
*F01N 9/00* (2006.01)
(Continued)

(52) U.S. Cl.
CPC .......... *F01N 11/002* (2013.01); *F01N 3/021* (2013.01); *F01N 9/00* (2013.01); *F01N 9/002* (2013.01); *F01N 13/008* (2013.01); *F01N 3/206* (2013.01); *F01N 3/2066* (2013.01); *F01N 13/009* (2014.06); *F01N 2560/08* (2013.01); *F01N 2570/14* (2013.01); *F01N 2610/02* (2013.01); *F01N 2900/0416* (2013.01); *F01N 2900/08* (2013.01);
(Continued)

(58) Field of Classification Search
CPC .......... F01N 11/002; F01N 9/00; F01N 3/021; F01N 13/008; F01N 13/009; F01N 3/2066
See application file for complete search history.

(56) References Cited

U.S. PATENT DOCUMENTS

| 4,608,640 A | 8/1986 | Shinzawa et al. |
| 7,104,050 B2 | 9/2006 | Sato et al. |

(Continued)

FOREIGN PATENT DOCUMENTS

| CN | 101228436 A | 7/2008 |
| CN | 101886567 A | 11/2010 |

(Continued)

OTHER PUBLICATIONS

Search report issued for UK Patent Application No. 1618955.7, dated Apr. 3, 2017, 5 pages.
(Continued)

*Primary Examiner* — Patrick D Maines
(74) *Attorney, Agent, or Firm* — Foley & Lardner LLP

(57) ABSTRACT

A system can include an engine, an aftertreatment system with a particulate filter, and a controller. The controller is configured to compare a time value since a last delta pressure soot load estimate process to a predetermined time threshold. Responsive to the time value being greater than or equal to the predetermined time threshold, the controller decreases a flow threshold value to a lower flow threshold value. If the flow amount is greater than or equal to the lower flow threshold value, then the controller activates a delta pressure soot load estimation process. A combined soot load estimate is then calculated using a delta pressure soot load estimation of the delta pressure soot load estimate process responsive to the lower flow threshold value.

25 Claims, 3 Drawing Sheets

(51) Int. Cl.
*F01N 13/00* (2010.01)
*F01N 3/021* (2006.01)
*F01N 3/20* (2006.01)

(52) U.S. Cl.
CPC ....... *F01N 2900/1606* (2013.01); *Y02T 10/20* (2013.01); *Y02T 10/47* (2013.01)

(56) References Cited

U.S. PATENT DOCUMENTS

| | | | |
|---|---|---|---|
| 7,134,275 | B2 | 11/2006 | Tsutsumoto et al. |
| 7,181,909 | B2 | 2/2007 | Sato et al. |
| 7,231,291 | B2 | 6/2007 | Dollmeyer et al. |
| 7,249,456 | B2 | 7/2007 | Schulte et al. |
| 7,281,369 | B2 | 10/2007 | Emi et al. |
| 7,343,738 | B2 | 3/2008 | Tsutsumoto et al. |
| 7,484,357 | B2 | 2/2009 | Dollmeyer et al. |
| 7,500,358 | B2 | 3/2009 | Singh et al. |
| 7,677,032 | B2 | 3/2010 | Berryhill et al. |
| 8,069,658 | B2 | 12/2011 | He et al. |
| 8,316,635 | B2 | 11/2012 | Zhang et al. |
| 8,612,115 | B2 | 12/2013 | George et al. |
| 8,646,257 | B2 | 2/2014 | Svensson et al. |
| 8,935,953 | B2 | 1/2015 | Sun et al. |
| 2003/0230079 | A1 | 12/2003 | Kuboshima et al. |
| 2005/0000207 | A1 | 1/2005 | Christl |
| 2005/0120712 | A1 | 6/2005 | Tsutsumoto et al. |
| 2005/0188681 | A1 | 9/2005 | Emi et al. |
| 2005/0235634 | A1 | 10/2005 | Schulte et al. |
| 2006/0016177 | A1 | 1/2006 | Tsutsumoto et al. |
| 2006/0179826 | A1* | 8/2006 | Kuboshima ............. F01N 9/002 60/297 |
| 2007/0061064 | A1* | 3/2007 | Dollmeyer ............. F01N 9/002 701/114 |
| 2009/0183495 | A1* | 7/2009 | Onodera ............. F01N 3/0231 60/286 |
| 2010/0037684 | A1* | 2/2010 | Harshbarger ........... F01N 3/021 73/114.76 |
| 2010/0126145 | A1* | 5/2010 | He ......................... F01N 9/002 60/286 |
| 2010/0313629 | A1* | 12/2010 | Singh ..................... F01N 3/023 73/23.31 |
| 2014/0338434 | A1* | 11/2014 | Sun ..................... F02D 41/1448 73/114.75 |
| 2014/0352281 | A1 | 12/2014 | Whitt et al. |
| 2015/0088399 | A1 | 3/2015 | Sun et al. |
| 2015/0267590 | A1* | 9/2015 | Sun ....................... F01N 11/002 60/274 |

FOREIGN PATENT DOCUMENTS

| | | |
|---|---|---|
| CN | 103221654 A | 7/2013 |
| CN | 103306791 A | 9/2013 |
| EP | 1 437 497 A1 | 7/2004 |
| EP | 2 138 693 | 12/2009 |

OTHER PUBLICATIONS

Chinese Office Action issued for Chinese Patent Application No. 201611020598.6, dated Aug. 3, 2018, 5 pages.

Brazil Office Action issued for Brazil Patent Application No. PI0714276-5, dated Sep. 25, 2018, 6 pages.

* cited by examiner

SOOT LOAD ESTIMATION DURING IDLE OR LOW LOAD

TECHNICAL FIELD

The present application relates generally to the field of aftertreatment systems for internal combustion engines.

BACKGROUND

For internal combustion engines, such as diesel engines, nitrogen oxide ($NO_x$) compounds and particulate matter may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant such as anhydrous ammonia, aqueous ammonia, or urea is typically introduced into the exhaust gas flow prior to the catalyst chamber. A diesel particulate filter (DPF) can be included with the internal combustion engine, either alone or within an SCR system, to remove the particulate matter from the exhaust stream. In some instances, the DPF may be upstream of the selective catalytic reduction system, downstream of the selective catalytic reduction system or within the selective catalytic reduction system. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to soot load estimation during idle or low load operating conditions. During idle or low load operating conditions, the pressure measurements for a delta pressure soot load estimation (DPSLE) process may be at low values such that small errors due to the pressure sensor equipment and/or other system errors may affect the measurements. Accordingly, at such idle or low load speeds, a controller for detecting the soot build up on the aftertreatment components may disregard or not use such measurements for the detection of soot buildup due to the reliability. However, when an engine operates at low speed for an extended period of time, such as more than 5 hours, 10 hours, 50 hours, or 100 hours, then the disregarded soot load estimate from the DPSLE process may result in an inaccurate estimate, not recognizing the soot buildup, such as in a DPF of the aftertreatment system, if only a mass-based soot load rate (MBSLR) estimation process is used. Accordingly, a controller subroutine may periodically (e.g., every 8 hours, 10 hours, 20 hours, etc.) decrease the flow threshold for using a DPSLE measurement and/or increase the engine speed and/or modify the exhaust gas recirculation (EGR) valve to increase the exhaust gas flow through the aftertreatment system to a sufficiently high level to acquire a DPSLE measurement. In some implementations, the controller subroutine may modify a fuel pressure, a start of injection, a geometry of a variable geometry turbocharger, and/or an intake or exhaust throttle to increase the exhaust gas flow through the aftertreatment system. The DPSLE measurement can then be used as a known data point to update the combined soot load estimate (CSLE). In some implementations, the controller may also decrease the flow threshold for the CSLE to use the DPSLE measurement.

One implementation relates to a system that includes an engine, an aftertreatment system with a particulate filter, and a controller. The controller is configured to receive engine operating conditions for the engine and compare the engine operating conditions to one or more engine operating threshold values. The controller is also configured to compare a time value since a last delta pressure soot load estimate process to a predetermined time threshold. The controller is further configured to decrease a flow threshold value to a lower flow threshold value responsive to the time value being greater than or equal to the predetermined time threshold, compare a flow amount to the lower flow threshold value, and activate a delta pressure soot load estimation process responsive to determining the flow amount is greater than or equal to the lower flow threshold value. The controller is further configured to calculate a combined soot load estimate using a delta pressure soot load estimation of the delta pressure soot load estimate process responsive to the lower flow threshold value.

In some implementations, the engine operating conditions include an engine operating time and the one or more engine operating threshold values include a predetermined engine time threshold value. The predetermined engine time threshold value may be at least 5 hours. In some implementations, the engine operating conditions include an engine revolutions per minute (RPM) and the one or more engine operating threshold values include a predetermined engine revolutions per minute threshold value. In some implementations, the controller can be further configured to increase a flow amount in the aftertreatment system responsive to the time value being greater than or equal to the predetermined time threshold. In some implementations, increasing the flow amount in the aftertreatment system includes closing an exhaust gas recirculation valve and/or increasing an engine revolutions per minute. Increasing the engine revolutions per minute may occur during a power take off regeneration process, which may include modifying the engine revolutions per minute to a first value for a first period of time and modifying the engine revolutions per minute to a second value for a second period of time after the first period of time. In still further implementations, the controller may be further configured to decrement the lower flow threshold value over time. In still further implementations, the controller may be further configured to activate a regeneration process for the particulate filter based on a soot load estimate of the delta pressure soot load estimation process.

Another implementation relates to a method for intrusively increasing exhaust flow to update a delta pressure soot load estimate process. The method includes comparing a time value since a last delta pressure soot load estimate process to a predetermined time threshold and decreasing a flow threshold value to a lower flow threshold value responsive to the time value being greater than or equal to the predetermined time threshold. The method also includes increasing a flow amount in an aftertreatment system of the engine responsive to the time value being greater than or equal to the predetermined time threshold, comparing the increased flow amount to the lower flow threshold value, and activating a delta pressure soot load estimation process responsive to determining the increased flow amount is greater than or equal to the flow threshold value. The method further includes calculating a combined soot load estimate using a delta pressure soot load estimation of the delta pressure soot load estimate process responsive to the lower flow threshold value.

In some implementations, decreasing the flow threshold value is based on an engine operating time and/or an engine revolutions per minute. In some implementations, increasing the flow amount in the aftertreatment system includes closing an exhaust gas recirculation valve and/or increasing an engine revolutions per minute. Increasing the engine revolutions per minute may occur during a power take off regeneration process. In still further implementations, the method may also include activating a regeneration process for a particulate filter based on the combined soot load estimate.

Yet a further implementation relates to an apparatus including a controller that includes a mass-based soot load rate circuit, a delta pressure soot load estimation circuit, a combined soot load estimate circuit, and a low flow soot operations circuit. The mass-based soot load rate circuit is configured to determine a mass-based soot load estimate for a particulate filter of an aftertreatment system and the delta pressure soot load estimation circuit is configured to determine a delta pressure soot load estimate for the particulate filter of the aftertreatment system. The combined soot load estimate circuit is configured to determine a combined soot load estimate for the particulate filter of the aftertreatment system based on the mass-based soot load estimate and the delta pressure soot load estimate. The low flow soot operations circuit is configured to compare a time value since a last delta pressure soot load estimate to a predetermined time threshold. The low flow soot operations circuit is also configured to decrease a flow threshold value to a lower flow threshold value responsive to the time value being greater than or equal to the predetermined time threshold, increase a flow amount in the aftertreatment system of the engine responsive to the time value being greater than or equal to the predetermined time threshold, compare the increased flow amount to the lower flow threshold value, and activate a delta pressure soot load estimation process of the delta pressure soot load estimation circuit responsive to determining the increased flow amount is greater than or equal to the lower flow threshold value. The low flow soot operations circuit is further configured to calculate a combined soot load estimate using a delta pressure soot load estimation of the delta pressure soot load estimate process responsive to the lower flow threshold value.

In some implementations, decreasing the flow threshold value is based on an engine operating time and/or an engine revolutions per minute. In some implementations, increasing the flow amount in the aftertreatment system includes closing an exhaust gas recirculation valve and/or increasing an engine revolutions per minute. Increasing the engine revolutions per minute may occur during a power take off regeneration process. In still further implementations, the low flow soot operations circuit is further configured to periodically decrement the lower flow threshold value. In some implementations, the predetermined time threshold value is at least 5 hours.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
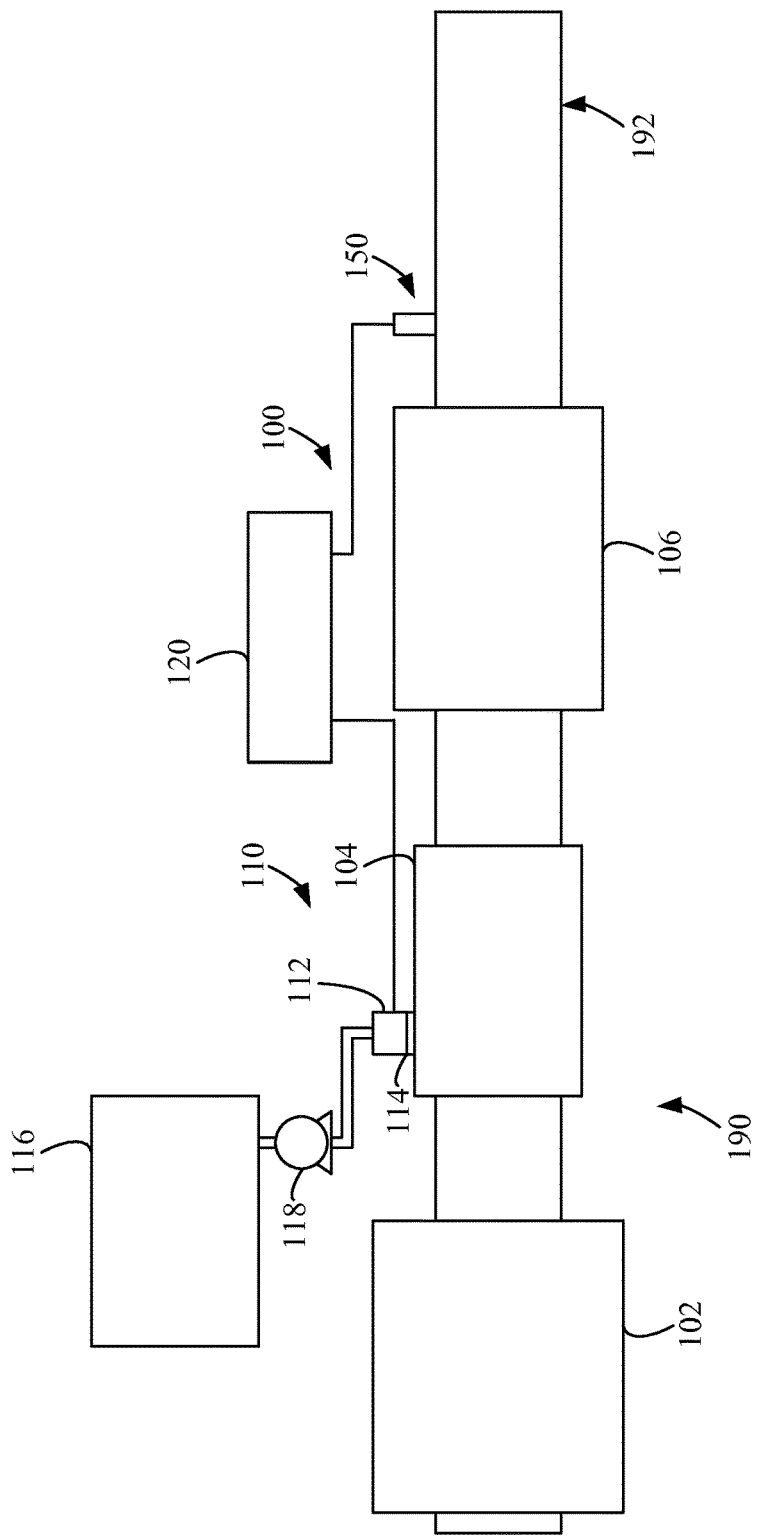
FIG. 1 is a block schematic diagram of an example aftertreatment system having a diesel particulate filter for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for estimating soot loading at idle or low speeds. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some engines, the detection of the amount of soot built up on downstream aftertreatment components utilizes a delta pressure measurement of the change in pressure across an aftertreatment component, such as through the use of an upstream and downstream pressure sensor. Such an estimate of the soot load on the downstream aftertreatment components can be referred to as the delta pressure soot load estimate (DPSLE). In some other implementations and/or in combination with the DPSLE, the detection of the amount of soot built up on downstream aftertreatment components utilize a mass-based soot load rate (MBSLR) that uses a model to estimate the amount of soot mass expelled downstream of the engine based on the operating conditions of the engine. In some instances, the DPSLE and MBSLR may be combined into a CSLE that is used during operation of an engine to estimate the soot load on the aftertreatment components, such as a particulate filter and, more particularly, a diesel particulate filter (DPF).

In some implementations that utilize diesel engines, such as engines deployed as an energy or other power sources and/or in vehicles with light loads or transient duty cycles, the engine may idle or operate at a low speed power take off (PTO) for an extended period of time. For instance, a diesel engine deployed as a power generator and/or for other uses at a field operation, such as for oil and gas operations, the engine may idle and/or operate at a low load for extended periods of time. During such extended periods of time, soot and other particulate matter is continually generated and builds up downstream of the engine in an aftertreatment system. In vehicles with light loads or transient duty cycles, such as fire trucks, garbage trucks, school buses, etc., the engine may also idle and/or operate at a low load for extended periods of time such that soot and other particulate matter is continually generated and builds up downstream of the engine in an aftertreatment system.

While the DPSLE may be useful during higher speed operation to estimate the soot loading, at idle and/or low speed operation, the pressure measurements may be low values such that even small errors due to the pressure sensor equipment and/or other system errors may affect the measurements. Accordingly, at such idle or low speeds, a controller for detecting the soot build up on the aftertreatment components may disregard or not use such measurements for the detection of soot buildup due to the reliability. When an engine operates at low speed for an extended period of time, such as more than 10 hours, more than 50 hours, or more than 100 hours, then disregarding the DPSLE over this period of time may result in significant soot buildup, such as in a DPF of the aftertreatment system.

In implementations that also use the MBSLR estimate for soot loading, the MBSLR may be sufficient for estimating the soot loading when the DPSLE is inaccurate. However, because the MBSLR is a model based estimated rate of soot buildup based on engine operating conditions, even small errors in the estimate and/or varying conditions in which the engine is operating may affect the actual soot buildup relative to the model-based estimate. Accordingly, over an extended period of time, the MBSLR soot load estimate may deviate from the actual soot loading such that significant soot buildup may occur even if the MBSLR estimates a lower soot loading.

In some instances, when the engine is operated above idle and/or above the low speed PTO after such an extended period of time, then the DPSLE may be read due the increased flow through the aftertreatment system resulting in more accurate pressure measurements. However, after such extended periods of idle or low speed operation, the soot buildup may be significant enough to result in an error or fault code being issued due to excessive soot buildup. Accordingly, it may be advantageous to include a controller subroutine and/or mechanism for updating the CSLE and/or acquiring a sufficiently accurate DPSLE measurement during the extended period of time such that the soot loading can be more accurately estimated over the extended periods of time and/or a regeneration/desorption process can be triggered to reduce the soot loading. For instance, a controller subroutine may periodically (e.g., every 8 hours, 10 hours, 20 hours, etc.) decrease a flow threshold value for using the DPSLE soot load estimate and/or increase the exhaust gas flow through the aftertreatment system to a sufficiently high level to acquire a sufficiently accurate DPSLE measurement, such as by increasing the engine speed and/or modifying the EGR valve. The DPSLE measurement can then be used for the combined soot load estimate. Thus, even over extended periods of operation at idle and/or low speed PTO, the combined soot loading estimate may be more accurately estimated by periodically acquiring DPSLE measurements. By increasing the accuracy of the soot loading estimate, the amount of soot loading can be more effectively managed to reduce the likelihood of excessive soot buildup and/or trigger fault codes or errors when the engine is operated at a higher speed than idle and/or the low speed PTO.

II. Overview of Aftertreatment System

FIG. 1 depicts an aftertreatment system 100 having an example reductant delivery system 110 for an exhaust system 190. The aftertreatment system 100 includes a particulate filter (namely a diesel particulate filter (DPF) 102), the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

Figure 3:
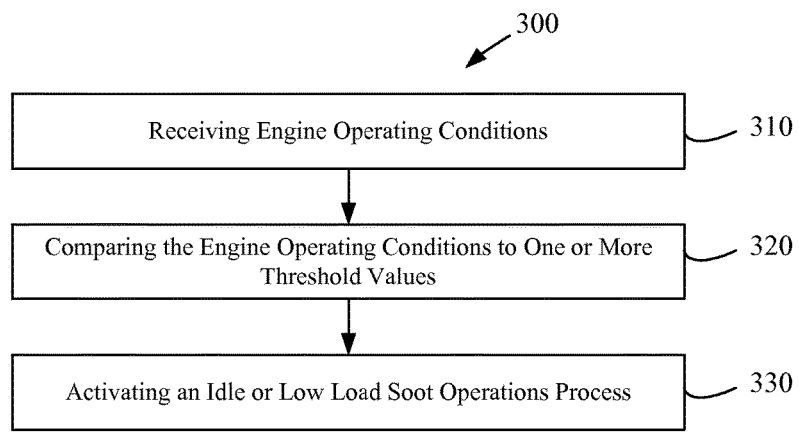
FIG. 3 is a block diagram of an implementation of a process for activating an idle or low load soot operations process.
Figure 4:
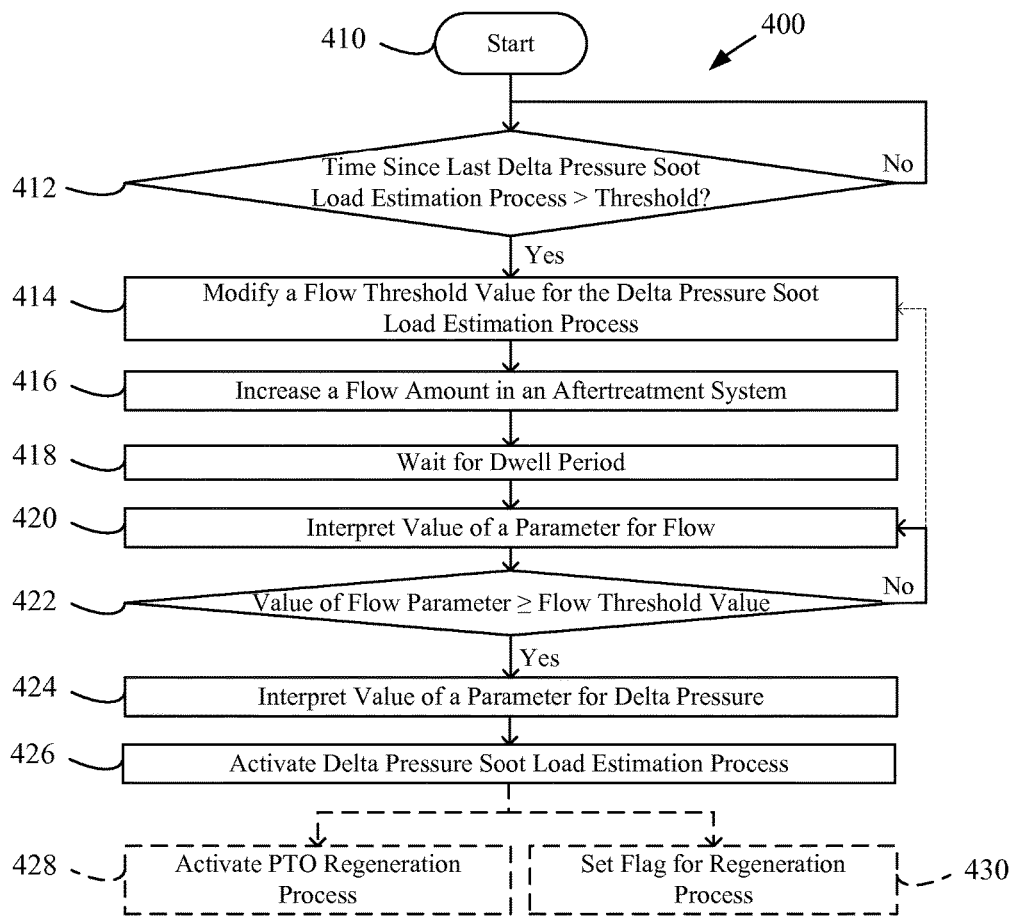
FIG. 4 is a process diagram of an implementation of an idle or low load soot operations process to activate a delta pressure soot load estimation process.

In certain implementations, the controller 120 is structured to perform certain operations, such as those described herein in relation to FIGS. 3-5. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more circuits structured to functionally execute the operations of the controller 120. In certain implementations, the controller 120 may include a MBSLR circuit a DPSLE circuit, a combined soot load estimate circuit, and a low flow soot operations circuit for performing the operations described in reference to FIGS. 3-5. The description herein including circuits emphasizes the structural independence of the aspects of the controller 120 and illustrates one grouping of operations and responsibilities of the controller 120. Other groupings that execute similar overall operations are understood within the scope of the present application. Circuits may be implemented in hardware and/or as computer instructions on a non-transient computer readable storage medium, and circuits may be distributed across various hardware or computer based components. More specific descriptions of certain embodiments of controller operations are included in the section referencing FIGS. 3-5.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as an SDPF. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190

III. Implementations of Soot Load Estimation at Idle or Low Load

Figure 2:
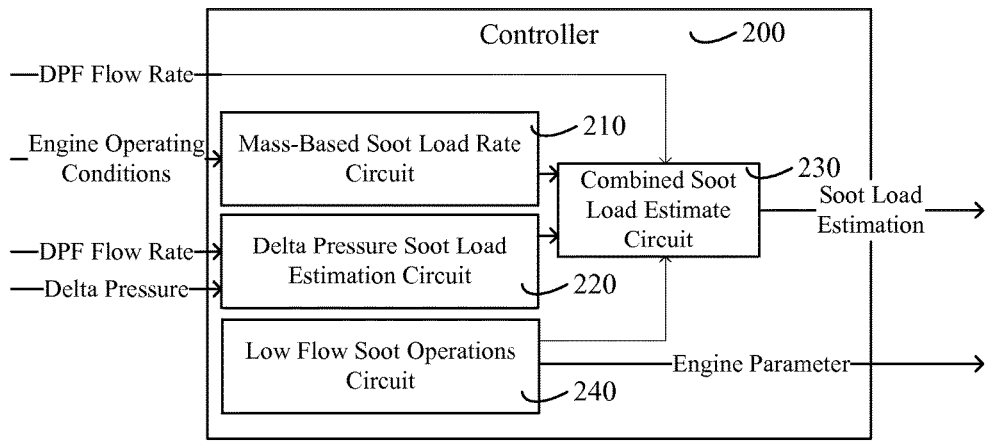
FIG. 2 is a block diagram of an example controller having a mass-based soot load rate circuit, a delta pressure soot load estimation circuit, a combined soot load estimation circuit, and a low flow soot operations circuit.

FIG. 2 depicts an implementation of a controller 200, such as controller 120 of FIG. 1, having a MBSLR circuit 210, a DPSLE circuit 220, a CSLE circuit 230, and a low flow soot operations circuit 240. In some implementations, the controller 200 can be configured to perform the operations of the circuits 210, 220, 230, 240 described herein. The MBSLR circuit 210 is configured to interpret one or more parameters for engine operating conditions indicative of values representative of engine operating conditions, such as a fuel mass rate, engine RPM, air intake mass flow rate, an engine runtime value, etc. The MBSLR circuit 210 can also interpret a parameter indicative of one or more parameters for engine operating conditions indicative of values representative of engine operating conditions from a look-up table, such as one or more look-up tables stored in data storage. The MBSLR circuit 210 generates a soot load estimation value based on the one or more parameters for the engine operating conditions. For example, the MBSLR circuit 210 can receive the one or more parameters for the engine operating conditions and determine an estimated soot load using an equation or look-up table, such as a mass transfer equation to calculate the mass of soot expelled into the exhaust system from the engine based on the operating conditions and/or retrieving a value from a look-up table using the one or more parameters for the engine operating conditions as index values.

The DPSLE circuit 220 is configured to interpret a parameter indicative of a value representative of a change in pressure across a component of the aftertreatment system, such as the DPF 102 of FIG. 1. That is, pressure sensors may be located upstream and downstream of the component of the aftertreatment system. A measurement of the pressure upstream and downstream of the component of the aftertreatment system can be taken and the differential between the two values (e.g., $P_{upstream} - P_{downstream}$) can be calculated as the delta pressure, $\Delta P$, across the component of the aftertreatment system. The DPSLE circuit 220 calculates a soot load estimation value based on the delta pressure value and, in some implementations, other parameter values (e.g., exhaust temperature, exhaust mass flow rate, DPF flow rate, etc.).

The soot load estimate from the MBSLR circuit 210 and the DPSLE circuit 220 are received by the CSLE circuit 230 and used to calculate a CSLE value. In some implementations, the CSLE circuit 230 receives a parameter indicative of a value representative of a DPF flow rate, such as an ACMS rate indicative of the volume of exhaust gases flowing through DPF per second. The CSLE circuit 230 may be configured to compare the DPF flow rate to a predetermined threshold value, such as 0.38 ACMS. If the DPF flow rate is below the predetermined threshold value, then the soot load estimate from the DPSLE circuit 220 may be less accurate due to the low flow. Accordingly, in some implementations, the DPSLE circuit 220 may be deactivated while the DPF flow rate is below the threshold. In other implementations, the soot load estimate from the DPSLE circuit 220 may be disregarded by the CSLE circuit 230.

For extended idle or low RPM PTO operations, the CSLE circuit 230 may disregard or not use the soot load estimate from the DPSLE circuit 220 for extended periods of time. This causes the combined soot load estimate to be determined from the soot load estimate of the MBSLR circuit 210 alone, which can degrade in accuracy progressively with time. However as time progresses and the accuracy of the MBSLR circuit's 210 soot load estimate also degrades, it may be preferable to utilize a less accurate soot load estimate from the DPSLE circuit 220 than only the soot load estimate from the MBSLR circuit 210. In some instances, after prolonged idle or low RPM PTO operation, if the engine is operated such that the DPF flow rate increases above the threshold value so the soot load estimate value from the DPSLE circuit 220 can be used, then the actual soot load may be high due to compounded errors from the soot load estimate of the MBSLR circuit 210, which can result in the need for service or other intervention to remedy the high soot load.

The low flow soot operations circuit 240 is configured to interpret a parameter indicative of a time of when the DPF flow rate last exceeded the predetermined threshold value for DPF flow rate and to compare the time to a time threshold value, such as 8 hours, 10 hours, 20 hours, 100 hours, or any other time threshold value. The low flow soot operations circuit 240 can start a timer when the DPF flow rate last exceeded the predetermined threshold value for DPF flow rate and compare the timer value to the time threshold value periodically. If the DPF flow rate increases above the predetermined threshold value for DPF flow rate prior to the timer value exceeding the time threshold value, then the low flow soot operations circuit resets the timer. If the timer value exceeds the time threshold value, then, in some implementations, the low flow soot operations circuit 240 outputs a new, lower predetermined threshold value for DPF flow rate.

For instance, where the predetermined threshold value for the DPF flow rate is 0.38 ACMS and if the time of when the DPF flow rate last exceeded the predetermined threshold value is 11 hours compared to a time threshold value of 10 hours, then the low flow soot operations circuit 240 outputs a new, lower predetermined threshold value for DPF flow rate, such as 0.25 ACMS, 0.2 ACMS, etc., to the CSLE circuit 230. Thus, if the DPF flow rate is below 0.38 ACMS, but above 0.25 ACMS or 0.2 ACMS, then the CSLE circuit 230 can utilize the soot load estimate from the DPSLE circuit 220 to generate the combined soot load estimate by the CSLE circuit 230, which may correct for any compounded errors that result from the soot load estimate of the MBSLR circuit 210 over the extended period of time. The enhancement allows the soot load estimate of the DPSLE circuit 220 to be "trusted" at lower ACMS after prolonged periods where the soot load estimate of the MBSLR circuit 210 alone for the combined soot load estimate may be less accurate. If the DPF flow rate is still below the lower predetermined threshold value, then the DPSLE circuit 220 will remain in a standby mode and is not used by the CSLE circuit 230. In some instances, if the DPSLE circuit 220 is "trusted", then the value output from the DPSLE circuit 220 to the CSLE circuit 230 can be given a greater weight than normal. In some further instances, if the DPF flow rate is above the lower predetermined threshold value for a total calibratable time, such as 3 minutes, 5 minutes, 10 minutes, 15 minutes, 30 minutes, etc., and the DPSLE circuit 220 provides values to the CSLE circuit 230 for the calibratable time, then the lower predetermined threshold value may be increased back to the predetermined threshold value and the process can repeat. During the calibratable time, the lower predetermined threshold value is used even if the DPF flow rate exceeds the higher predetermined threshold value. In some implementations, the total calibratable time can include aggregating shorter discrete time periods when the DPF flow rate is above the lower predetermined threshold value.

In some implementations, the low flow soot operations circuit 240 may decrement the predetermined threshold value for DPF flow rate over time. For instance, the low flow soot operations circuit 240 may decrement the predetermined threshold value for the DPF flow rate at periodic increments, such as 0.01 ACMS per hour, 0.015 ACMS per hour, etc. Accordingly, the low flow soot operations circuit 240 may slowly decrease the predetermined threshold value for the DPF flow rate over time until the DPF flow rate exceeds the threshold value to utilize the soot load estimate of the DPSLE circuit 220.

In some instances, desorption events occur periodically, such as every 10 hours. However, in some instances, desorption events may not produce enough flow for the DPF flow rate to exceed the predetermined threshold value. In some implementations, the low flow soot operations circuit 240 may modify one or more engine parameters to increase the DPF flow rate. For instance, during desorption events, such as hydrocarbon desorb events, the low flow soot operations circuit 240 can modify one or more engine parameters and/or apply different engine parameters during the desorption event such that the DPF flow rate exceeds the predetermined threshold value. The one or more engine parameters may include an engine RPM, an EGR amount, etc.

In some implementations, the modified one or more engine parameters may be applied for the duration of the desorption event. In other implementations, the modified one or more engine parameters may be applied during an initial time period then the prior engine parameters may be applied for the remainder of the desorption event, such as a dual speed event. During a dual speed event, the engine parameters may be initially set to the modified engine parameters to operate the engine at a higher speed for a short amount of time then the prior engine speed can be used to release the hydrocarbons for the remainder of the desorb event time, limiting the impact to fuel economy and avoiding the risk or releasing hydrocarbons too quickly while also raising the DPF flow rate above the lowered predetermined threshold value. The additional flow produced by the modified one or more engine parameters may not be enough to exceed the predetermined threshold value for the DPF flow rate, but can be set to be sufficient to exceed the lowered DPF flow rate. In some implementations utilizing the hydrocarbon desorption events, the engine parameters can be retrieved from a look-up table such as Table 1 below:

TABLE 1

Engine RPM based on Air Temperature and Desorption Event Time

| | | Desorption Event Time (sec) | | | |
|---|---|---|---|---|---|
| | | 0 s | 120 s | 130 s | 6000 s |
| Air Temperature (° C.) | −25.1° C. | 850 | 850 | 850 | 850 |
| | −25° C. | 850 | 850 | 800 | 800 |
| | −10.1° C. | 850 | 850 | 800 | 800 |
| | −10° C. | 850 | 850 | 760 | 760 |

Thus, during the desorption event, the low flow soot operations circuit 240 may utilize the engine RPM parameters from Table 1 to increase the engine speed to increase DPF flow rate sufficiently to exceed the threshold value of the CSLE circuit 230.

In some further implementations, the CSLE circuit 230 may assign a weighting factor to the DPSLE circuit 220 soot load estimate based on the difference between the threshold value and the measured DPF flow rate (e.g., the weighting factor can be assigned with 0.1 ACMS having a weight of 0 and 0.38 ACMS having a weight of 1.0, and the values between 0.1 ACMS and 0.38 ACMS may be weighted proportionally). That is, as the DPF flow rate decreases below the predetermined threshold weight of 0.38 ACMS toward the low bound of 0.1 ACMS, the weighting of the soot load estimate from the DPSLE circuit 220 may be decreased when used by the CSLE circuit 230. The weighting factor may be used as a trust factor value, which indicates the reliability of the DPSLE circuit 220 estimate. For example, the CSLE circuit 230 may use only a percentage of the DPSLE circuit 220 estimate proportionate to the reliability as indicated by the trust factor value. If the trust factor indicates that the DPSLE circuit's 220 estimate's reliability is very low, the CSLE circuit 230 may use proportionately much more or all of the MBSLR circuit's 210 estimate relative to the DPSLE circuit's 220 estimate to determine the combined soot load estimate value. If the trust factor indicates that the DPSLE circuit's 220 estimate's reliability is very high, the CSLE circuit 230 may use proportionately much more or all of the DPSLE circuit's 220 estimate with the MBSLR circuit's 210 estimate to determine the combined soot load estimate value.

FIG. 3 depicts a block diagram of an implementation of a process 300 for activating an idle or low load soot operations process. The process 300 includes receiving engine operating conditions (block 310), comparing the engine operating conditions to one or more threshold values (block 320), and activating an idle or low load soot operations process (block 330).

At block 310, a controller, such as controller 120, 200 receives engine operating conditions (block 310). The engine operating conditions may be one or more parameters that are interpreted by the controller and/or a circuit of the controller. For instance, the engine operating conditions may include a flow rate, such as a DPF flow rate, an engine RPM, an air intake mass flow, an engine operating time, and/or other parameters indicative of the engine operating conditions.

The process 300 includes comparing the engine operating conditions to one or more threshold values (block 320), such as engine operating threshold values. In some implementations, a parameter indicative of a value representative of a DPF flow rate, such as an actual cubic meter per second (ACMS) rate indicative of the volume of exhaust gases flowing through DPF per second, is compared to a predetermined threshold value, such as 0.38 ACMS. In some implementations, a parameter indicative of a value representative of an engine RPM is compared to a predetermined engine RPM threshold value, such as 800 RPM, 750 RPM, 700 RPM, etc. In some implementations, a parameter indicative of a value representative of an air intake mass flow is compared to a predetermined threshold value. In some implementations, a parameter indicative of a value representative of an engine operating time is compared to a predetermined engine time threshold value, such as 5 hours, 10 hours, 20 hours, 50 hours, 100 hours, etc. Still further engine operating conditions can be compared to one or more threshold values.

In some implementations, if the DPF flow rate is below the corresponding predetermined threshold value, then the engine may be operating in an idle or low load mode such that the DPSLE soot load estimate is not updating. In other implementations, determining that the DPSLE soot load estimate is not updating may be based on additional engine operating parameters, either in addition to or in lieu of the DPF flow rate. For instance, in some implementations, the determination may also be based on one or more of the engine operating time exceeding a threshold value, the engine RPM being below a threshold value, and/or the air intake mass flow being below a threshold value. In still further implementations, the determination may be based on the engine operating conditions used must meet the threshold criteria for a predetermined period of time, such as one minute, 15 minutes, 30 minutes, an hour, two hours, etc. The predetermined period of time can be set such that the determination of the idle or low load condition does not occur during transient or minimal operating times at idle or low load.

If the DPSLE soot load estimate is not updating, then the process 300 includes activating an idle or low load soot operations process (block 330). The idle or low load soot operations process may include activating the low flow soot operations circuit 240 of FIG. 2 to output a new, lower predetermined threshold value for DPF flow rate to the CSLE circuit 230, and/or modify one or more engine parameters.

FIG. 4 depicts a process diagram of an implementation of an idle or low load soot operations process 400 for decreasing a flow threshold value and/or increasing an exhaust flow rate in an aftertreatment system to activate a delta pressure soot load estimation process. The process 400 begins when activated (block 410). In some implementations, the activation of the idle or low load soot operations process 400 is responsive to activating an idle or low load soot operations process (block 330) of FIG. 3.

The process 400 includes comparing the time since the last DPSLE process occurred to a predetermined time threshold (block 412). In some implementations, a time for the last used soot load estimate from the DPSLE circuit 220 can be stored in a memory of the controller. The stored time can be compared to a current engine operation time to determine the time since the last DPSLE process occurred. The time since the last DPSLE process occurred is compared to the time threshold value, such as 5 hours, 8 hours, 10 hours, 20 hours, 50 hours, 100 hours, etc. If the time since the last DPSLE process occurred is not greater than the time threshold value, then the process returns to block 412 to compare the time to the time threshold again. In some implementations, a delay time may be included to delay the subsequent comparison to avoid continually comparing the time to the time threshold. For instance, the delay time may be 30 minutes, 45 minutes, an hour, two hours, five hours, etc.

In some other implementations, when the idle or low load soot operations process is started or activated (block 410), a timer may be started as an approximation for the time since the last DPSLE process and is compared to the time threshold value. Thus, the time for the prior DPSLE process does not need to be stored, but can be approximated by the value of the timer. In some implementations, if a DPF flow rate increases above a predetermined threshold value for DPF flow rate prior to the timer value exceeding the time threshold value, then the timer and/or time value may be reset.

If the time since the last DPSLE process occurred is greater than the threshold value, then the process 400 may include modifying a flow threshold value for the DPSLE process (block 414). The modification to the flow threshold value includes modifying the predetermined threshold value for the DPF flow rate, such as 0.38 ACMS to a new, lower predetermined threshold value for DPF flow rate, such as 0.25 ACMS, 0.2 ACMS, etc.

In some implementations, the process 400 can include to increasing a flow amount in an aftertreatment system (block 416). Increasing the flow amount in the aftertreatment system can include closing an EGR valve (either partially or fully), increasing engine RPM, etc. Increasing the flow amount increasing the engine RPM may occur when the engine is at idle and not during PTO operation. In some implementations, increasing a flow amount in the aftertreatment system may occur during or trigger a desorption event. Increasing the flow amount in the aftertreatment system may include operating the engine at a first speed for a first period of time during a desorption event and a second speed for a second period of time during a desorption event. Table 1 provides some example values for operating the engine at the first speed (e.g., 850 RPM) for the first period of time (0 seconds to 120 seconds) and the second speed (e.g., 760 RPM, 800 RPM, 850 RPM) for the second period of time (130 seconds to 6000 seconds or any other end value for the desorption event). In some implementations, the first speed may be less than the second speed.

In some implementations, the process 400 may include waiting for a dwell period (block 418) to allow the increase in flow amount to propagate and stabilize through the aftertreatment system. For instance, the dwell period may be one minute, two minutes, five minutes, etc.

A parameter indicative of the flow is interpreted (block 420) and is compared to the lower flow threshold value (block 422). The parameter indicative of the flow may be interpreted from a flow rate sensor in the aftertreatment system and/or through a feedforward estimate of the flow rate. If the value of the flow parameter is below the lowered predetermined threshold, then the process may return to interpret a new value of the parameter for the flow (block 420), e.g., remain in a standby mode, and/or may return to modify the flow threshold value to a new, lower threshold value (block 418). In implementations that modify the flow threshold value to a new, lower threshold value (block 418), the process 400 may decrement the predetermined threshold value, such as 0.01 ACMS per hour, 0.015 ACMS per hour, etc. after process 400 is activated.

If the value of the flow parameter is above the lowered predetermined threshold value, such as 0.25 ACMS or 0.2 ACMS, then the DPSLE can be trusted. The process 400 includes interpreting a value of a parameter for the delta pressure (block 424). The interpretation of the parameter for the delta pressure includes interpreting a parameter indicative of a value representative of a change in pressure across a component of the aftertreatment system, such as the DPF 102 of FIG. 1. That is, pressure sensors may be located upstream and downstream of the component of the aftertreatment system. A measurement of the pressure upstream and downstream of the component of the aftertreatment system can be taken and the differential between the two values (e.g., $P_{upstream} - P_{downstream}$) can be calculated as the delta pressure, $\Delta P$, across the component of the aftertreatment system.

A DPSLE process is activated (block 426) to generate a soot load estimate. For instance, the DPSLE circuit 220 of FIG. 2 calculates a soot load estimation value based on the delta pressure value and, in some implementations, other parameter values (e.g., exhaust temperature, exhaust mass flow rate, etc.).

The soot load estimate of the DPSLE process can then be used with the soot load estimate from the MBSLR process (such as that implemented by the MBSLR circuit 210) to calculate a combined soot load estimate (CSLE) value. In some implementations, a weighting factor to the soot load estimate of the DPSLE process may be applied based on the difference between the threshold value and the measured DPF flow rate (e.g., the weighting factor can be assigned with 0.1 ACMS having a weight of 0 and 0.38 ACMS having a weight of 1.0, and the values between 0.1 ACMS and 0.38 ACMS may be weighted proportionally). That is, as the DPF flow rate decreases below the predetermined threshold weight of 0.38 ACMS toward the low bound of 0.1 ACMS, the weighting of the soot load estimate from the DPSLE process may be decreased when used for the CSLE value. The weighting factor may be used as a trust factor value, which indicates the reliability of the DPSLE estimate. For example, the combined soot load estimate may use only a percentage of the DPSLE estimate proportionate to the reliability as indicated by the trust factor value. If the trust factor indicates that the DPSLE process's estimate's reliability is very low, the combined soot load estimate may use proportionately much more or all of the MBSLR estimate relative to the DPSLE estimate to determine the combined soot load estimate value. If the trust factor indicates that the DPSLE process's estimate's reliability is very high, the combined soot load estimate may use proportionately much more or all of the DPSLE estimate with the MBSLR estimate to determine the combined soot load estimate value.

In some implementations, if the parameter indicative of the flow is above the lower predetermined threshold value for a total calibratable time, such as 3 minutes, 5 minutes, 10 minutes, 15 minutes, 30 minutes, etc., and the DPSLE process continues to provide values to for the CSLE value for the calibratable time, then the lower flow threshold value may be increased back to the higher predetermined threshold value and the process 400 can repeat. During the calibratable time, the lower flow threshold value is used even if the parameter indicative of the flow exceeds the higher predetermined threshold value. In some implementations, the total calibratable time can include aggregating shorter discrete time periods when the parameter indicative of the flow is above the lower predetermined threshold value, even if there is an intervening period where the parameter indicative of the flow is below the lower flow threshold value.

In some implementations, the process 400 includes activating a PTO regeneration process (428). Based on the CSLE value generated with the soot load estimate of the DPSLE process, a determination is made that the soot load for the DPF may be too high and a PTO regeneration process may be initiated to regenerate the DPF. In other implementations, the process 400 may set a flag for a regeneration process (block 430). For instance, if other conditional parameters are not currently met, the flag may be set such that, when the conditional parameters are met, that a regeneration process occurs. In some implementations, the regeneration process may be initiated without meeting the other conditional parameters.

In some implementations, the process 400 may not increase the flow amount in the aftertreatment system (block 416), but only modify the flow threshold value for the DPSLE process (block 414). In other implementations, the process 400 may not modify the flow threshold value for the DPSLE process (block 414), but only increase the flow amount in the aftertreatment system (block 416).

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   an engine;
   an aftertreatment system including a particulate filter; and
   a controller configured to:
      receive engine operating conditions for the engine;
      compare the engine operating conditions to one or more engine operating threshold values;
      compare a time value since a last delta pressure soot load estimate process to a predetermined time threshold;
      decrease a flow threshold value to a lower flow threshold value responsive to the time value being greater than or equal to the predetermined time threshold;
      compare a flow amount to the lower flow threshold value;
      activate a delta pressure soot load estimation process and calculate a combined soot load estimate using a delta pressure soot load estimation of the delta pressure soot load estimate process, responsive to determining the flow amount is greater than or equal to the lower flow threshold value.

2. The system of claim 1, wherein the engine operating conditions comprise an engine operating time, and wherein the one or more engine operating threshold values comprise a predetermined engine time threshold value.

3. The system of claim 2, wherein the predetermined engine time threshold value is at least 5 hours.

4. The system of claim 1, wherein the engine operating conditions comprise an engine revolutions per minute, and wherein the one or more engine operating threshold values comprise a predetermined engine revolutions per minute threshold value.

5. The system of claim 1, wherein the controller is further configured to:
increase a flow amount in the aftertreatment system responsive to the time value being greater than or equal to the predetermined time threshold.

6. The system of claim 5, wherein increasing the flow amount in the aftertreatment system comprises closing an exhaust gas recirculation valve.

7. The system of claim 5, wherein increasing the flow amount in the aftertreatment system comprises increasing an engine revolutions per minute.

8. The system of claim 7, wherein increasing the engine revolutions per minute occurs during a power take off regeneration process.

9. The system of claim 8, wherein the power take off regeneration process includes modifying the engine revolutions per minute to a first value for a first period of time and modifying the engine revolutions per minute to a second value for a second period of time after the first period of time.

10. The system of claim 1, wherein the controller is further configured to decrement the lower flow threshold value over time.

11. The system of claim 1, wherein the controller is further configured to:
activate a regeneration process for the particulate filter based on a soot load estimate of the delta pressure soot load estimation process.

12. A method for intrusively increasing exhaust flow to update a delta pressure soot load estimate process comprising:
comparing a time value since a last delta pressure soot load estimate process to a predetermined time threshold;
decreasing a flow threshold value to a lower flow threshold value responsive to the time value being greater than or equal to the predetermined time threshold;
increasing a flow amount in an aftertreatment system of the engine responsive to the time value being greater than or equal to the predetermined time threshold;
comparing the increased flow amount to the lower flow threshold value;
activating a delta pressure soot load estimation process and calculating a combined soot load estimate using a delta pressure soot load estimation of the delta pressure soot load estimate process, responsive to determining the increased flow amount is greater than or equal to the flow threshold value.

13. The method of claim 12, wherein decreasing the flow threshold value is based on an engine operating time.

14. The method of claim 12, wherein decreasing the flow threshold value is based on an engine revolutions per minute.

15. The method of claim 12, wherein increasing the flow amount in the aftertreatment system comprises closing an exhaust gas recirculation valve.

16. The method of claim 12, wherein increasing the flow amount in the aftertreatment system comprises increasing an engine revolutions per minute.

17. The method of claim 16, wherein increasing the engine revolutions per minute occurs during a power take off regeneration process.

18. The method of claim 12, further comprising:
activating a regeneration process for a particulate filter based on the combined soot load estimate.

19. An apparatus comprising a controller including:
a mass-based soot load rate circuit configured to determine a mass-based soot load estimate for a particulate filter of an aftertreatment system;
a delta pressure soot load estimation circuit configured to determine a delta pressure soot load estimate for the particulate filter of the aftertreatment system;
a combined soot load estimate circuit configured to determine a combined soot load estimate for the particulate filter of the aftertreatment system based on the mass-based soot load estimate and the delta pressure soot load estimate; and
a low flow soot operations circuit configured to:
compare a time value since a last delta pressure soot load estimate to a predetermined time threshold;
decrease a flow threshold value to a lower flow threshold value responsive to the time value being greater than or equal to the predetermined time threshold;
increase a flow amount in the aftertreatment system of the engine responsive to the time value being greater than or equal to the predetermined time threshold;
compare the increased flow amount to the lower flow threshold value;
activate a delta pressure soot load estimation process of the delta pressure soot load estimation circuit and calculate a combined soot load estimate using a delta pressure soot load estimation of the delta pressure soot load estimate process, responsive to determining the increased flow amount is greater than or equal to the lower flow threshold value.

20. The apparatus of claim 19, wherein decreasing the flow threshold value is based on an engine operating time.

21. The apparatus of claim 19, wherein decreasing the flow threshold value is based on an engine revolutions per minute.

22. The apparatus of claim 19, wherein increasing the flow amount in the aftertreatment system comprises closing an exhaust gas recirculation valve.

23. The apparatus of claim 19, wherein increasing the flow amount in the aftertreatment system comprises increasing an engine revolutions per minute during a power take off regeneration process.

24. The apparatus of claim 19, wherein the low flow soot operations circuit is further configured to periodically decrement the lower flow threshold value.

25. The apparatus of claim 19, wherein the predetermined time threshold value is at least 5 hours.

* * * * *